(12) United States Patent
Fritschle et al.

(10) Patent No.: US 9,822,878 B2
(45) Date of Patent: Nov. 21, 2017

(54) MASTER CYLINDER

(71) Applicants: Stefan Fritschle, Bad Urach (DE); Michael Ruopp, Berghuelen (DE)

(72) Inventors: Stefan Fritschle, Bad Urach (DE); Michael Ruopp, Berghuelen (DE)

(73) Assignee: Gustav Magenwirth GmbH & Co. KG, Bad Urach (DE)

(*) Notice: Subject to any disclaimer, the term of this patent is extended or adjusted under 35 U.S.C. 154(b) by 522 days.

(21) Appl. No.: 14/284,054

(22) Filed: May 21, 2014

(65) Prior Publication Data

US 2014/0251125 A1   Sep. 11, 2014

Related U.S. Application Data

(63) Continuation of application No. PCT/EP2012/073244, filed on Nov. 21, 2012.

(30) Foreign Application Priority Data

Nov. 23, 2011  (DE) .......................... 10 2011 055 645

(51) Int. Cl.
*B60T 11/228*  (2006.01)
*F16J 10/02*  (2006.01)
(Continued)

(52) U.S. Cl.
CPC ............. *F16J 10/02* (2013.01); *B60T 11/232* (2013.01); *B60T 11/236* (2013.01); *F15B 7/10* (2013.01);
(Continued)

(58) Field of Classification Search
CPC ....... B60T 11/228; B60T 11/16; B60T 11/232
(Continued)

(56) References Cited

U.S. PATENT DOCUMENTS 4,514,985 A   5/1985  Cadeddu
5,090,201 A * 2/1992  Smith ....................... B60T 7/04
60/533
(Continued)

FOREIGN PATENT DOCUMENTS

DE           809032 C       7/1951
DE        10028673 A1      12/2001
(Continued)

*Primary Examiner* — F. Daniel Lopez
*Assistant Examiner* — Dustin T Nguyen
(74) *Attorney, Agent, or Firm* — Reinhart Boerner Van Deuren P.C.

(57) ABSTRACT

In order to provide a master cylinder, in particular for a clutch system, an actuating system or a braking system of a vehicle, which enables secure sealing of the cylinder chamber relative to the outside, as well as a reliable flow of hydraulic medium into the cylinder chamber, it is proposed that the piston comprises a first section which has a cylindrical lateral surface and a second section which has at least one region which is set back radially inwardly with respect to the cylindrical lateral surface of the first section, wherein at least one set-back region extends to an end of the piston and wherein the first and second sections are arranged on the piston in such a way that in an actuating position of the piston, the main sealing element in the first section of the piston abuts in sealing manner thereagainst and in the pressure equalization position of the piston, in the second section of the piston between the piston and the main sealing element, at least one gap is formed, through which hydraulic medium can flow along the piston from the supply chamber into the cylinder chamber in order to equalize the pressure.

14 Claims, 10 Drawing Sheets

(51) Int. Cl.
*B60T 11/232* (2006.01)
*B60T 11/236* (2006.01)
*F16D 25/08* (2006.01)
*F15B 7/10* (2006.01)

(52) U.S. Cl.
CPC ...... *F16D 25/088* (2013.01); *F16D 2025/081* (2013.01)

(58) Field of Classification Search
USPC ..... 60/588, 585, 586; 92/169.2–169.4, 171.1
See application file for complete search history.

(56) References Cited

U.S. PATENT DOCUMENTS

| | | | |
|---|---|---|---|
| 5,794,512 A * | 8/1998 | Prosch | B60K 23/02 403/122 |
| 5,823,094 A * | 10/1998 | Shimizu | F16D 25/12 60/585 |
| 6,272,858 B1 * | 8/2001 | Takano | B60T 11/20 60/588 |
| 2002/0020291 A1 | 2/2002 | Keller et al. | |
| 2003/0213240 A1 * | 11/2003 | Nix | B60T 11/16 60/588 |
| 2004/0035666 A1 * | 2/2004 | Grosspietsch | F16D 13/583 192/48.8 |
| 2011/0072963 A1 * | 3/2011 | Buck | F16J 15/3236 92/240 |
| 2011/0296827 A1 | 12/2011 | Ruopp et al. | |

FOREIGN PATENT DOCUMENTS

| | | |
|---|---|---|
| DE | 102008063241 A1 | 6/2010 |
| DE | 102009047281 A1 | 6/2011 |
| DE | 102011088469 A1 | 7/2012 |
| EP | 0032857 A1 | 1/1981 |
| WO | WO 2013/076146 A3 | 5/2013 |

* cited by examiner

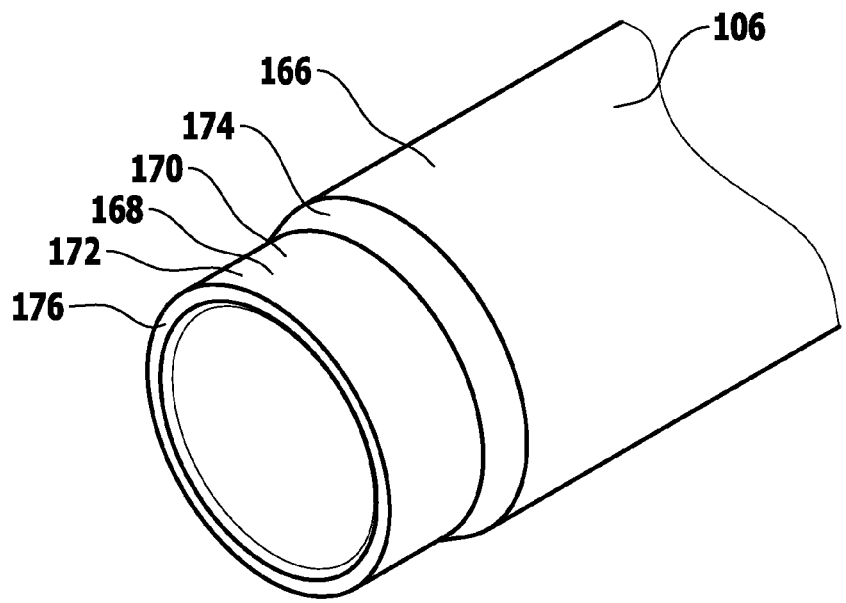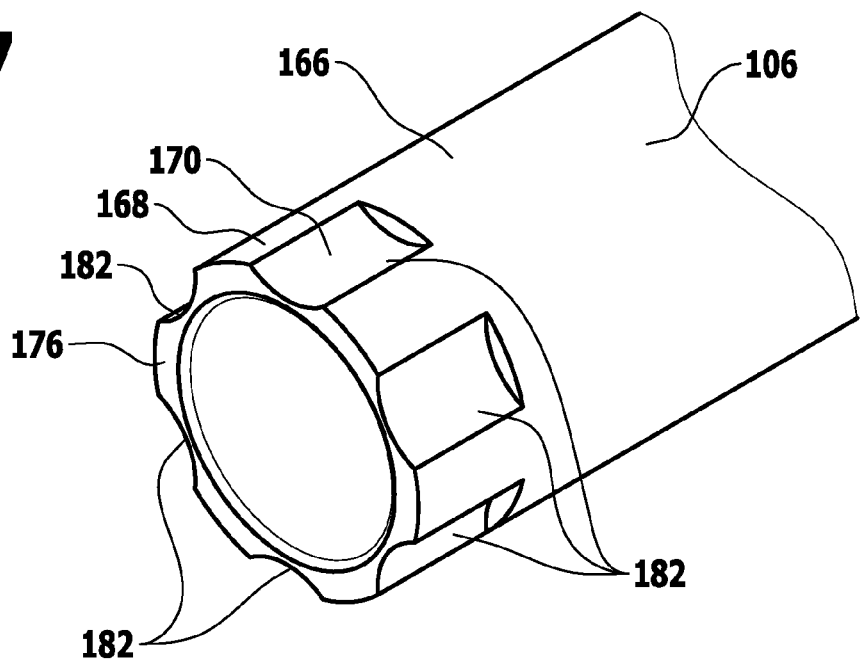

MASTER CYLINDER

CROSS-REFERENCE TO RELATED PATENT APPLICATIONS

This application is a continuation of International application No. PCT/EP2012/073244 filed on Nov. 21, 2012.

This patent application claims the benefit of International application No. PCT/EP2012/073244 of Nov. 21, 2012 and German application number 10 2011 055 645.1 of Nov. 23, 2011, the teachings and disclosure of which are hereby incorporated in their entirety by reference thereto.

BACKGROUND OF THE INVENTION

The present invention relates to a master cylinder, in particular for a clutch system, actuating system or braking system of a vehicle, comprising a cylinder housing with a piston bore and a cylinder chamber, a piston arranged displaceably in the piston bore between an actuating position and a pressure equalisation position, and a main sealing element arranged between the cylinder housing and the piston and delimiting the cylinder chamber. In the cylinder housing, at least one supply opening is provided which opens on a side of the main sealing element facing away from the cylinder chamber into an intermediate space between the piston and the cylinder housing on one side and into a supply chamber on the other side.

From DE 10 2008 063 241 A1, for example, there is known a master cylinder of this type. In the case of this master cylinder, it is provided that the piston is provided with a supply bore through which hydraulic medium can flow out of the supply chamber into an internal chamber of the piston.

It is an object of the present invention to provide a master cylinder which can be manufactured with little effort and enables secure sealing of the cylinder chamber relative to the outside, as well as a reliable flow of hydraulic medium into the cylinder chamber.

SUMMARY OF THE INVENTION

This object is achieved according to the invention in that the piston comprises a first section which has a cylindrical lateral surface and that the piston comprises a second section which has at least one region which is set back radially inwardly with respect to the cylindrical lateral surface of the first section, wherein the set-back region extends to an end of the piston facing toward the cylinder chamber and wherein the first and second sections are arranged on the piston in such a way that in an actuating position of the piston, the main sealing element in the first section of the piston abuts in sealing manner thereagainst and in the pressure equalisation position of the piston, in the second section of the piston between the piston and the main sealing element, at least one gap is formed, through which hydraulic medium can flow along the piston from the supply chamber into the cylinder chamber.

In that the piston comprises two sections, wherein one section has a cylindrical lateral surface and the further second section has at least one region which is set back radially inwardly with respect to the cylindrical lateral surface of the first section, wherein at least one set-back region extends to an end of the piston facing toward the cylinder chamber and wherein the two sections are arranged on the piston in such a way that, in the actuating position of the piston, the main sealing element in the first section of the piston abuts in sealing manner thereagainst and in the pressure equalisation position of the piston, in the second section of the piston between the piston and the main sealing element, at least one gap is formed, through which hydraulic medium can flow along the piston from the supply chamber into the cylinder chamber in order to equalise the pressure, a radial bore in the piston can preferably be dispensed with. In particular, as a result, the piston can be easily manufactured from plastics and particularly in an injection moulding process.

In one embodiment of the invention, it is provided that at least one region of the second section which is set back radially inwardly relative to the cylindrical lateral surface of the first section has a cylindrical lateral surface wherein an external diameter of the second section of the piston is smaller than an external diameter of the first section of the piston. In this way, the piston can be particularly easily manufactured.

It can be advantageous if a transition section of the piston, which is arranged between the first section and the second section of the piston, has an external diameter which increases along the piston from the external diameter of the second section to the external diameter of the first section. In this way, the piston can always abut particularly gently against the main sealing element without impairing the function of said sealing element after a large number of actuations of the master cylinder.

It can be provided, in particular, that the transition section of the piston which is arranged between the first section and the second section of the piston, has an external diameter which increases at least approximately continuously, in particular evenly, along the piston from the external diameter of the second section to the external diameter of the first section. It can be provided, for example, that the transition section is configured essentially with the form of a truncated cone (conically) or with a curved form having corresponding transition radii. In this way, wear of the main sealing element can be minimised.

In one embodiment of the invention, it is provided that the master cylinder comprises at least one back up sealing element for sealing the intermediate space between the piston and the cylinder housing, said back up sealing element being arranged on a side of at least one supply opening facing away from the cylinder chamber. By this means, unwanted escape of hydraulic medium can be reliably prevented.

It can be favourable if the master cylinder comprises at least one main sealing element and/or at least one back up sealing element which is configured as an O-ring seal, an X-ring seal, a lip seal or a plunger seal. In this way, particularly effective sealing of the master cylinder can be achieved.

In particular, it can be provided that at least one sealing element, for example, a main sealing element and/or a back up element can be arranged in a seating in the cylinder housing and/or in a seating in the piston.

It can be advantageous if at least one sealing element comprises an annular base member.

At least one sealing element is preferably configured so that a radially externally situated support lip extends from an annular base member in the direction of the cylinder chamber.

Furthermore, the sealing preferably takes place relative to a lateral surface of the piston (piston skirt surface) in that, starting from the base member of the sealing element, a radially inwardly positioned sealing lip extends in the direction of the cylinder chamber, wherein, particularly in the actuating position of the piston, the sealing lip abuts against the lateral surface of the piston.

In order to achieve a good seal, the radially inwardly situated sealing lip is preferably configured flexible.

It can be advantageous if the sealing lip is configured such that it can be placed radially inwardly against the piston lateral surface with bias.

It can be advantageous if the radially inwardly situated sealing lip becomes positioned radially inwardly when under pressure and is therefore pressed against the piston lateral surface. By this means, the sealing function of the sealing element can be optimised.

In one embodiment of the invention, it is provided that the cylinder housing is formed in at least two parts, wherein a base member of the cylinder housing has at least one sleeve bore in order to receive at least one cylinder sleeve of the cylinder housing. In this way, the cylinder housing can be particularly easily manufactured, especially from different materials. Therefore, in a configuration of this type, the cylinder housing does not necessarily need to fulfil the high surface requirements at all sites in order to provide the dynamic sealing surfaces needed. Rather, it can be sufficient if the dimensional consistency is of high quality in the region of the sealing of the piston and the at least one cylinder sleeve.

Preferably, the cylinder sleeve represents an optimum with regard to a design suited to plastics for an injection moulded component having a high degree of dimensional and surface quality.

Preferably, the cylinder housing comprises the base member and at least one cylinder sleeve.

At least one cylinder sleeve preferably serves to accommodate and guide the piston. For this purpose, it can be provided that at least one cylinder sleeve has an internal diameter which (disregarding tolerances) substantially corresponds to the external diameter of the piston.

Alternatively or in addition thereto, it can be provided that at least one cylinder sleeve forms at least one section of a wall of the cylinder chamber. In this way, the region of the cylinder chamber of the cylinder housing can be particularly easily manufactured. In this regard, it can be provided, in particular, that a connecting device for a hydraulic line is provided on the cylinder sleeve. A separate accommodating device for a hydraulic line of this type at the base member of the cylinder housing is then preferably dispensable.

At least one sleeve bore is preferably provided at an insertion side of the base member from which side the piston is inserted into the cylinder housing.

Alternatively or in addition, it is provided that at least one sleeve bore is arranged at a pressure side of the cylinder housing to which at least one hydraulic line can be connected.

In one embodiment of the invention, it is provided that at least one annular channel, in particular, at least one annular channel for hydraulic medium is formed on at least one cylinder sleeve. In this way, an even distribution of the hydraulic medium can be achieved.

It can be advantageous if at least one annular channel is formed on an external side of the cylinder sleeve facing, in the assembled state of the master cylinder, toward the base member of the cylinder housing.

Preferably, at least one medium channel extending along an actuating direction (movement direction) of the piston is formed on at least one cylinder sleeve. In this way, a medium can be guided particularly easily along the actuating direction of the piston, for example, along the cylinder chamber of the master cylinder.

In particular, it can be provided that, in the assembled state of the master cylinder, at least one medium channel is formed at an internal side of the cylinder sleeve facing away from the base member of the cylinder housing.

In one embodiment of the invention, it is provided that at least one supply opening is provided in at least one cylinder sleeve. In this way, by means of the at least one cylinder sleeve, a fluid connection can be facilitated between a supply chamber and the cylinder chamber.

It can be favourable if at least one supply opening in at least one cylinder sleeve connects at least one annular channel in the at least one cylinder sleeve to at least one medium channel in the at least one cylinder sleeve.

In this regard, it can be provided, in particular, that at least one cylinder sleeve comprises at least one annular channel arranged at an external side of the cylinder sleeve and at least one medium channel arranged at an internal side of the cylinder sleeve, wherein preferably the at least one medium channel is in fluid connection with at least one annular channel by means of the at least one supply opening.

It can be provided that at least one supply opening in at least one cylinder sleeve connects at least one annular channel in the at least one cylinder sleeve to an intermediate space between the piston and the at least one cylinder sleeve.

In particular, it can be provided that a plurality, for example, four supply openings, which preferably extend between an annular channel and the internal side of the cylinder sleeve which serves to guide the piston, are provided in a cylinder sleeve.

In one embodiment of the invention, it is provided that at least one supply opening in at least one cylinder sleeve connects at least one medium channel in the at least one cylinder sleeve and/or in the piston to the supply chamber. In this way, medium from the supply chamber can be fed particularly easily to the medium channel.

It can be advantageous if, in the assembled state of the master cylinder, a seating for a sealing element, in particular for the main sealing element of the master cylinder is provided between an end of a cylinder sleeve which faces toward the cylinder chamber, and serves to accommodate and guide the piston, and an end of the sleeve bore facing toward the cylinder chamber. In this way, the sealing element, in particular the main sealing element of the master cylinder, can be accommodated particularly easily and securely in the cylinder housing. In particular, by this means, undesirable slippage of the sealing element within the cylinder housing can be effectively prevented.

It can be advantageous if, in the assembled state of the master cylinder, a seating for a sealing element, in particular for the main sealing element of the master cylinder is provided between an end of a cylinder sleeve which faces toward the piston and forms at least one section of a wall of the cylinder chamber and an end of the sleeve bore facing toward the piston. By this means, also, secure accommodation of the sealing element, in particular the main sealing element of the master cylinder can be facilitated in the cylinder housing.

In an embodiment of the invention, it is provided that, in the assembled state of the master cylinder, a seating for a sealing element, in particular for the main sealing element of the master cylinder is provided between an end of a cylinder sleeve which faces toward the piston and forms at least one section of a wall of the cylinder chamber and an end of a cylinder sleeve which faces toward the cylinder chamber and serves to accommodate and guide the piston. In this case, the accommodation of the sealing element, in particular of the main sealing element of the master cylinder preferably takes place between two cylinder sleeves. The sleeve bores provided for receiving the two cylinder sleeves in the base member of the cylinder housing are preferably provided by a sleeve bore extending through the base member so that simple manufacturing of the base member of the cylinder housing is possible.

It can be advantageous if at least one medium channel is formed in the cylinder housing and/or in the piston, through which at least in the pressure equalisation position of the piston, hydraulic medium can flow from the end of at least one supply opening facing toward the piston to the main sealing element. It can be provided, in particular, that at least one medium channel is formed in a cylinder sleeve of the cylinder housing, through which, at least in the pressure equalisation position of the piston, hydraulic medium can flow from the end of at least one supply opening facing toward the piston to the main sealing element.

It can be advantageous if the piston is made at least partially, or at least in sections, of a plastics material. In particular, it can be provided that the piston is manufactured in an injection moulding process.

At least a part of the cylinder housing is preferably made of a thermoplastic material. In particular, it can be provided that the base member and/or at least one cylinder sleeve are made of a thermoplastic material.

The piston is preferably made in at least two parts.

In particular, it can be provided that the piston comprises at least two components arranged behind one another in relation to an actuating direction of the piston relative to the cylinder housing.

At least two components of the piston are preferably connected to one another by friction, in interlocking manner and/or in bonded manner. In particular, it can be provided that at least two components of the piston are latchable or latched to one another.

It is a further object of the present invention to provide a master cylinder of the type mentioned in the introduction with optionally one or more of the aforementioned features, wherein a simple and reliable sealing of the cylinder chamber relative to the exterior is possible.

This object is achieved according to the invention in that at least one sealing element is preferably connected by a substance-to-substance bond to a carrier element for the sealing element.

It can be advantageous if the carrier element is the piston.

It can also be provided that the carrier element is the cylinder housing, in particular a cylinder sleeve of the cylinder housing.

It can be favourable if the carrier element is an auxiliary element which is connectable or connected in force-locking manner, with a positive engagement or with a substance-to-substance bond to the piston and/or to the cylinder housing, in particular to at least one cylinder sleeve of the cylinder housing.

The sealing element is thus preferably a sealing element in at least two parts which comprises the actual sealing element, for example a sealing element made of an elastic, particularly elastomer, material and the carrier element.

The carrier element preferably is connectable or connected to the sealing element by means of a latching connection to the piston and/or to the cylinder housing, in particular to at least one cylinder sleeve of the cylinder housing.

It can be advantageous if the sealing element is vulcanised onto the carrier element.

As a sealing element of this type, in particular, a back up sealing element and/or a main sealing element can be provided.

In one embodiment of the invention, it is provided that the piston and/or the cylinder housing, in particular at least one cylinder sleeve of the cylinder housing, is provided with at least one seating device for accommodating the sealing element and/or the carrier element.

In particular, it can be provided that the piston and/or the cylinder housing, in particular at least one cylinder sleeve of the cylinder housing, is provided with at least one latching device for latching the sealing element and/or the carrier element on the piston or on the cylinder housing, in particular on the at least one cylinder sleeve of the cylinder housing.

In particular, it can be provided that the sealing element is formed as an O-ring which can be clipped onto the piston by means of the carrier element.

The piston is, in particular, a stepped input piston.

Further features and/or advantages of the invention are the subject matter of the following description and of the drawings illustrating exemplary embodiments.

BRIEF DESCRIPTION OF THE DRAWINGS

FIG. 6 shows a schematic perspective representation of the piston of the master cylinder of FIG. 1;

FIG. 7 shows a schematic perspective representation of a piston of a second embodiment of the master cylinder wherein a plurality of radially inwardly set-back regions are provided on the external side of the piston;

DETAILED DESCRIPTION OF THE INVENTION

Figure 1:
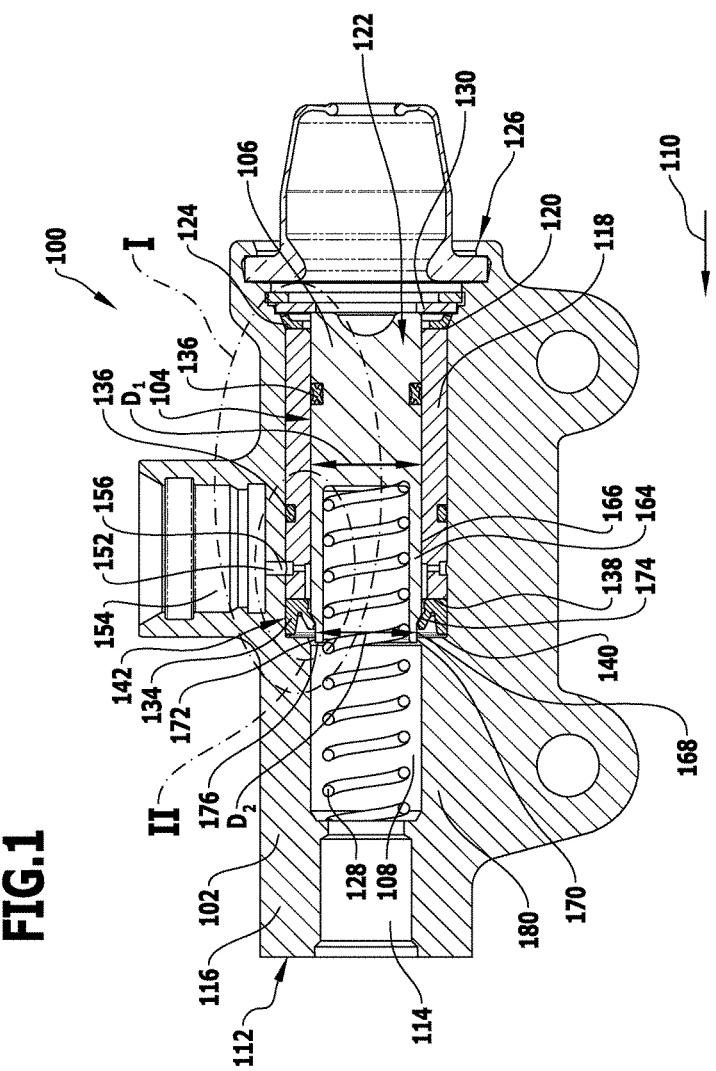
FIG. 1 shows a schematic longitudinal section through a first exemplary embodiment of a master cylinder in the pressure equalisation position.
Figure 2:
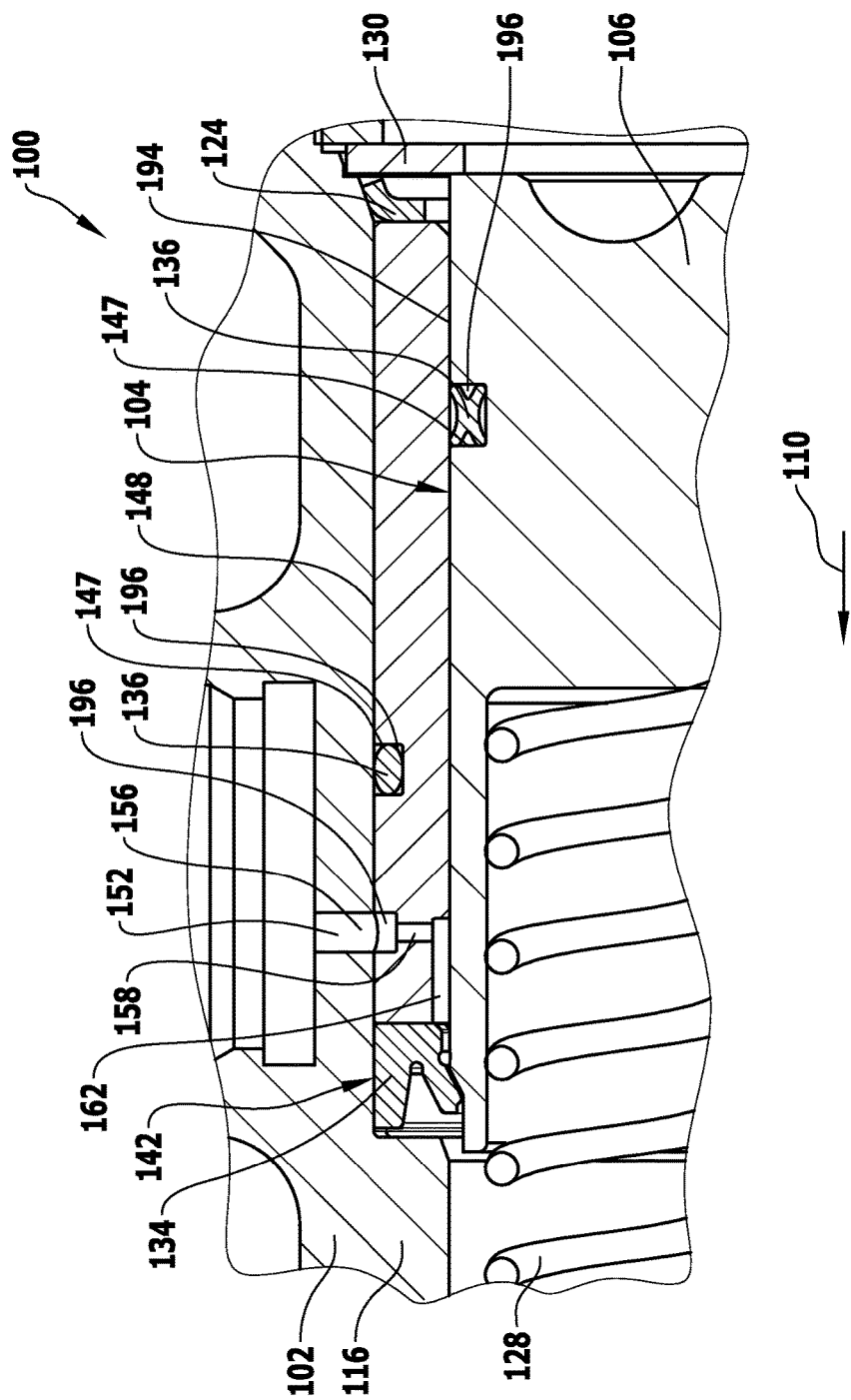
FIG. 2 shows an enlarged representation of the region I of FIG. 1.

The same or functionally equivalent elements are provided with the same reference signs in all the drawings.

A first embodiment of a master cylinder shown in FIGS. 1 to 6 and identified as a whole as 100, in particular a master cylinder for a motor vehicle with a regulated braking system, comprises a cylinder housing identified as a whole as 102, in which a piston bore identified as a whole as 104 is provided.

A piston identified as a whole as 106 and produced, for example, from injection moulded plastics is arranged in the piston bore 104, wherein, in a cylinder chamber 108 delimited by the piston 106 and the piston bore 104, the piston 106 can subject a hydraulic medium present in the cylinder chamber 108 to pressure by means of a movement of the piston 106 in an actuating direction 110 (movement direction).

In the cylinder housing 102, on a side of the cylinder housing 102 facing away from the piston bore 104 which represents a hydraulic side 112 of the cylinder housing 102, a hydraulic connector 114 is provided.

A hydraulic line (not shown) can be connected to this hydraulic connector 114 in order feed the hydraulic medium subjected to pressure in the cylinder chamber 108 by means of the piston 106 to, for example, a clutch system or a braking system (not shown) and thereby to apply pressure to this system.

In the first embodiment of the master cylinder 100 shown in FIGS. 1 to 6, the cylinder housing 102 is essentially configured in two parts and comprises a base member 116 and a cylinder sleeve 118.

The base member 116 is made, for example, of metal or plastics, in particular a thermoplastic material.

The cylinder sleeve 118 is made, for example, of plastics, in particular a thermoplastic material.

In order to receive the cylinder sleeve 118, the base member 116 comprises a sleeve bore 120 which extends coaxially to the piston bore 104 of the cylinder housing 102 and merely has a larger diameter than the piston bore 104.

The sleeve bore 120 serves to receive the cylinder sleeve 118 which is formed with a hollow cylindrical shape.

In the first embodiment of the master cylinder 100 shown in FIGS. 1 to 6, an internal chamber 122 of the cylinder sleeve 118 provides the actual piston bore 104 for receiving and guiding the piston 106.

The internal diameter of the cylinder sleeve 118 therefore substantially corresponds to the external diameter of the piston 106 so that the piston 106 can be guided substantially without play in the cylinder sleeve 118 and an intermediate space 194 between the piston 106 and the cylinder housing 102 is minimised.

The cylinder sleeve 118 is locked in the sleeve bore 120, for example, by means of a toothed ring 124 and is therefore fixed, in particular, in the actuating direction 110 of the piston 106.

Starting from an insertion side 126 of the cylinder housing 102 opposite to the hydraulic side 112, the piston 106 of the master cylinder 100 can be moved in the actuating direction 110 in order to subject the hydraulic medium to pressure in the cylinder chamber 108.

By means of a compression spring 128 which is arranged in the cylinder chamber 108, the piston 106 can be moved, following an actuation thereof, from the actuating position (see FIG. 4) resulting from the actuation, back into the pressure equalisation position shown in FIG. 1.

A stop element 130 which is arranged on the insertion side 126 of the cylinder housing 102, secures the piston 106 against unwanted expulsion against the actuating direction 110.

In order to seal the cylinder chamber 108, a plurality of sealing elements is provided, in particular a main sealing element 134 and two back up sealing elements 136.

In the first embodiment of the master cylinder 100 shown in FIGS. 1 to 6, the main sealing element 134 for sealing the cylinder chamber 108 is arranged between a front end 138 of the cylinder sleeve 118 facing toward the cylinder chamber 108 and a projection 140 of the base member 116 of the cylinder housing 102 forming the end of the sleeve bore 120.

By means of the projection 140 and the cylinder sleeve 118, therefore, in the first embodiment of the master cylinder 100 shown in FIGS. 1 to 6, a seating 142 for receiving the main sealing element 134 is formed.

The main sealing element 134 comprises an essentially annular base member 144 with which the main sealing element 134 abuts against the base member 116 of the cylinder housing 102 and an also annular sealing lip 146 which extends radially inwardly and in the actuating direction 110.

The sealing lip 146 of the main sealing element 134 abuts against the piston 106, particularly in the actuating position (see FIG. 4) of the master cylinder 100 and thereby seals the cylinder chamber 108 relative to the surroundings of the master cylinder 100.

The main sealing element 134 is therefore preferably configured as a so-called lip seal.

Thus, by means of the main sealing element 134, sealing between the base member 116 and the piston 106 is possible.

The back up sealing elements 136, by contrast, do not create a seal between the base member 116 and the piston 106, but between the base member 116 and the cylinder sleeve 118 or between the cylinder sleeve 118 and the piston 106.

One of the back up sealing elements 136 is therefore provided in an annular recess 147 which is formed by a peripheral groove 196 on the external side 148 of the cylinder sleeve 118. A back up sealing element 136 of this type is configured, in particular, as an O-ring seal or an X-ring seal.

The back up sealing element 136 for sealing between the cylinder sleeve 118 and the piston 106 is arranged, for example, in an annular recess 147 (peripheral groove 196) in the piston 106 and can also be configured as an O-ring seal or an X-ring seal.

In one embodiment of the master cylinder 100 (not shown), it can be provided that the back up sealing element 136 is arranged between the cylinder sleeve 118 and the piston 106 in an annular recess on an internal side 150 of the cylinder sleeve 118.

In order to supply hydraulic medium to the cylinder chamber 108, a supply opening 152 is provided in the cylinder housing 102, connecting a supply chamber 154 in the pressure equalisation position of the piston 106 to the cylinder chamber 108 so that hydraulic medium can flow out of the supply chamber 154 into the cylinder chamber 108.

In the first embodiment of the master cylinder 100 shown in FIGS. 1 to 6, the supply opening 152 is provided by a supply opening 156 in the base member 116 and a plurality of supply openings 158, for example, four supply openings 158 in the cylinder sleeve 118.

Figure 5:
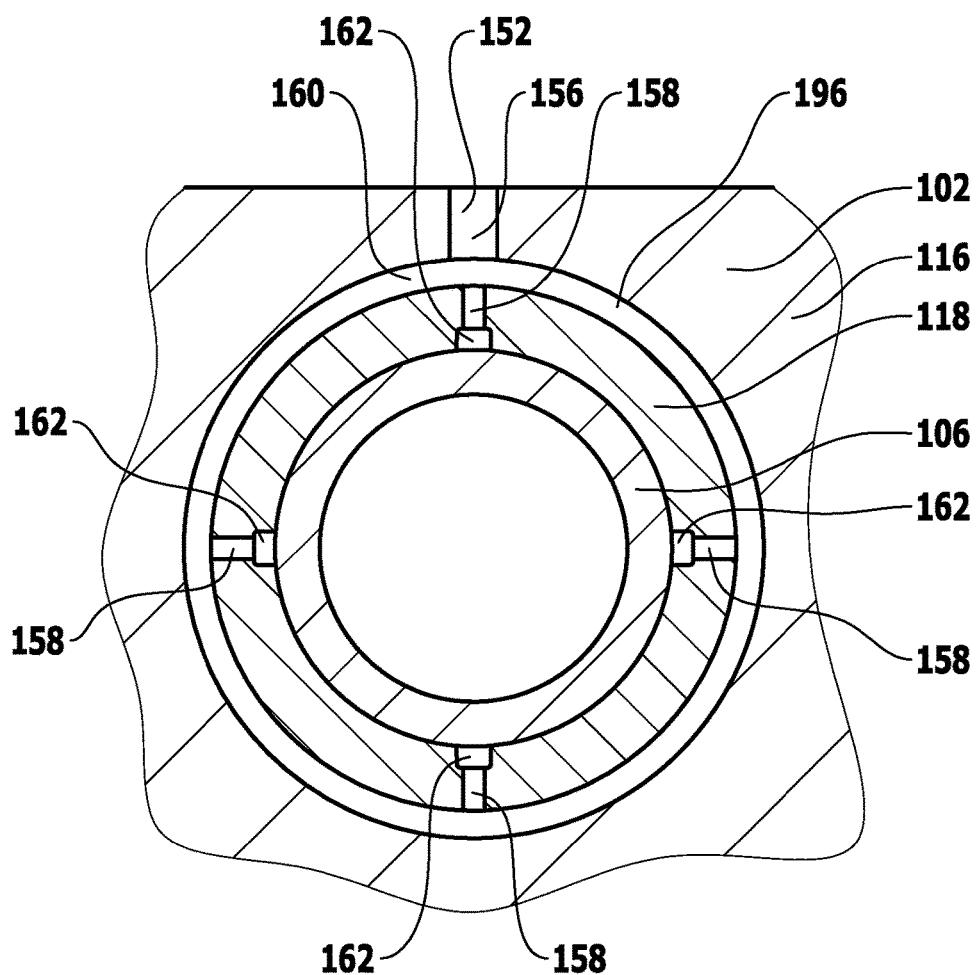
FIG. 5 shows a schematic cross-section through the master cylinder of FIG. 1 along the line 5-5 of FIG. 3.

As shown in particular in FIG. 5, the supply opening 156 in the base member 116 is in fluid communication with all the supply openings 158 in the cylinder sleeve 118 by means of an annular channel 160 provided on the external side 148 of the cylinder sleeve 118. The annular channel 160 is formed, in particular, by a peripheral groove 196.

Provided on the internal side 150 of the cylinder sleeve 118 are four medium channels 162 which extend from the supply openings 158 in the actuating direction 110 of the piston 106 as far as the front end 138 of the cylinder sleeve 118.

The medium channels 162 are formed as separate recesses or, in particular, as an annular recess (not shown) on the internal side 150 of the cylinder sleeve 118 and enable an, in particular, even feeding of hydraulic medium from the supply chamber 154 to the main sealing element 134 on the side of the main sealing element 134 facing away from the cylinder chamber 108.

In order to be able also to divert hydraulic medium past the main sealing element 134 and thereby to the cylinder chamber 108 of the main cylinder 100, in the first embodiment of the master cylinder 100 according to FIGS. 1 to 6, the piston 106 is provided with two different sections, wherein a first section 164 has a cylindrical lateral surface 166 and a second section 168 has at least one region 170 which is radially inwardly set back relative to the cylindrical lateral surface 166 of the first section 164.

In the first embodiment of the master cylinder 100 shown in FIGS. 1 to 6, a single set-back region 170 of the second section 168 is provided which comprises a cylindrical lateral surface 172, wherein the diameter $D_2$ of the cylindrical lateral surface 172 of the second section 168 is smaller than the diameter $D_1$ of the cylindrical lateral surface 166 of the first section 164.

Provided between the first section 164 and the second section 168 is a transition region 174 the surface of which substantially corresponds to that of a cone, so that a continuous transition between the first section 164 and the second section 168 of the piston 106 is ensured.

The set-back region 170 of the second section 168 extends from an end side 176 of the piston 106 to the transition section 174.

The external diameter $D_2$ of the second section 168 (the diameter of the cylindrical lateral surface 172 of the second section 168) is preferably smaller than an internal diameter of the main sealing element 134 in the pressure equalisation position of the master cylinder 100, so that in the pressure equalisation position of the master cylinder 100, when the piston 106 is positioned such that the sealing lip 146 of the main sealing element 134 is positioned adjacent to the second section 168, a gap 178 is formed between the second section 168 and the main sealing element 134.

The sealing lip 146 of the main sealing element 134 preferably extends obliquely to the actuating direction 110 such that a gap 178 with a substantially constant cross-section is formed between the transition section 174 of the piston 106 and the side of the sealing lip 146 facing toward the piston 106.

As a result of the gap 178 between the main sealing element 134 and the piston 106, in the pressure equalisation position of the master cylinder 100, hydraulic medium can flow into the cylinder chamber 108.

In the first embodiment of the master cylinder 100 shown in FIGS. 1 to 6, the cylinder housing 102 is formed in two parts and comprises the base member 116 and the cylinder sleeve 118.

The cylinder sleeve 118 serves to guide the piston 106. The cylinder chamber 108 is formed in the base member 116 so that a wall 180 of the cylinder chamber 108 is formed by the base member 116.

The hydraulic connector 114 is also formed directly in the base member 116.

The first embodiment of the master cylinder 100 described above functions as follows:

The master cylinder 100 initially lies in the pressure equalisation position shown in FIG. 1 in which the piston 106 has no force applied to it.

Due to the spring effect of the compression spring 128, the piston 106 is arranged in a position moved to a maximum extent against the actuating direction 110. Herein, the piston 106 abuts against the stop element 130.

Figure 3:
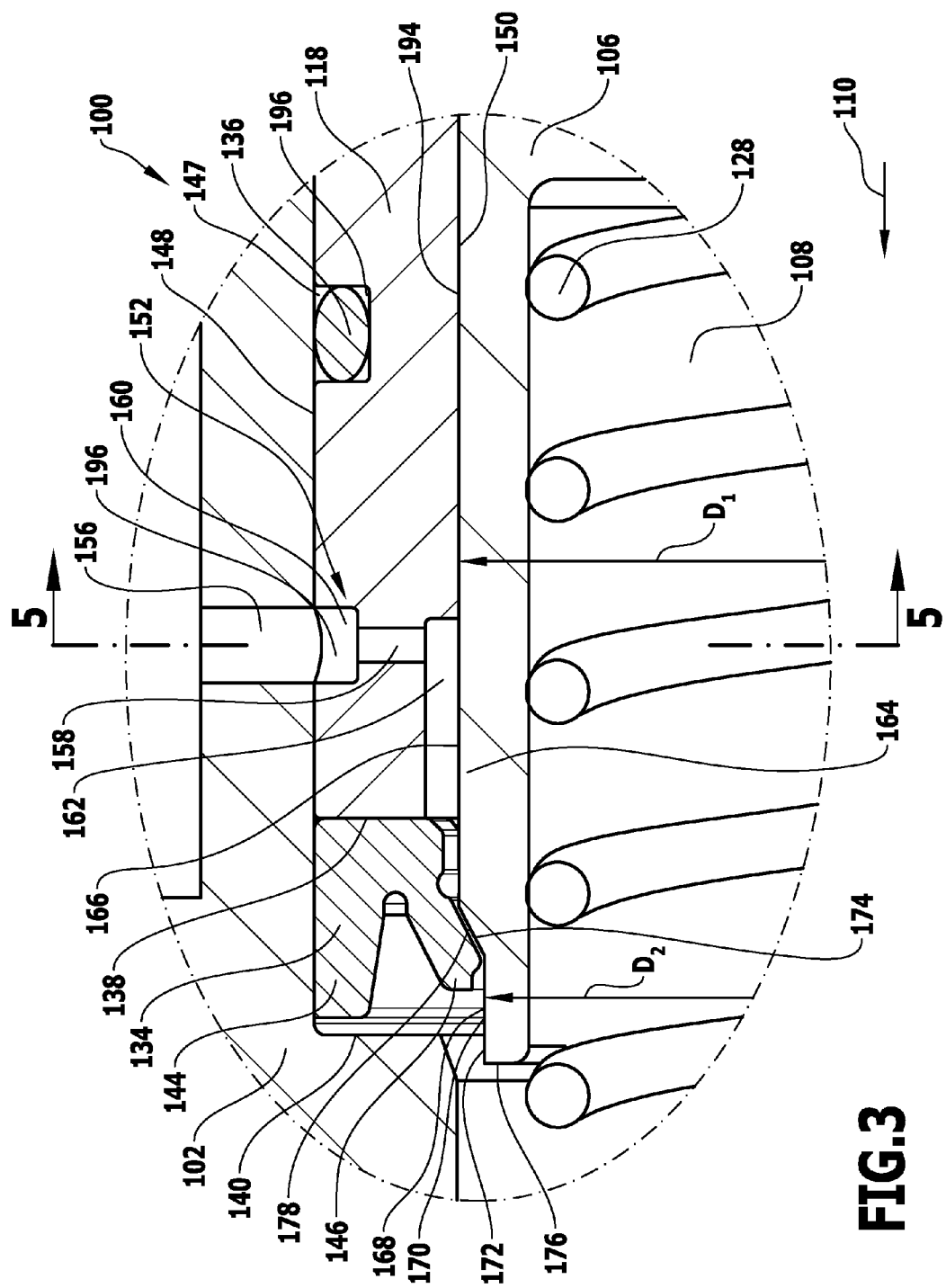
FIG. 3 shows an enlarged representation of the region II of FIG. 1.
Figure 4:
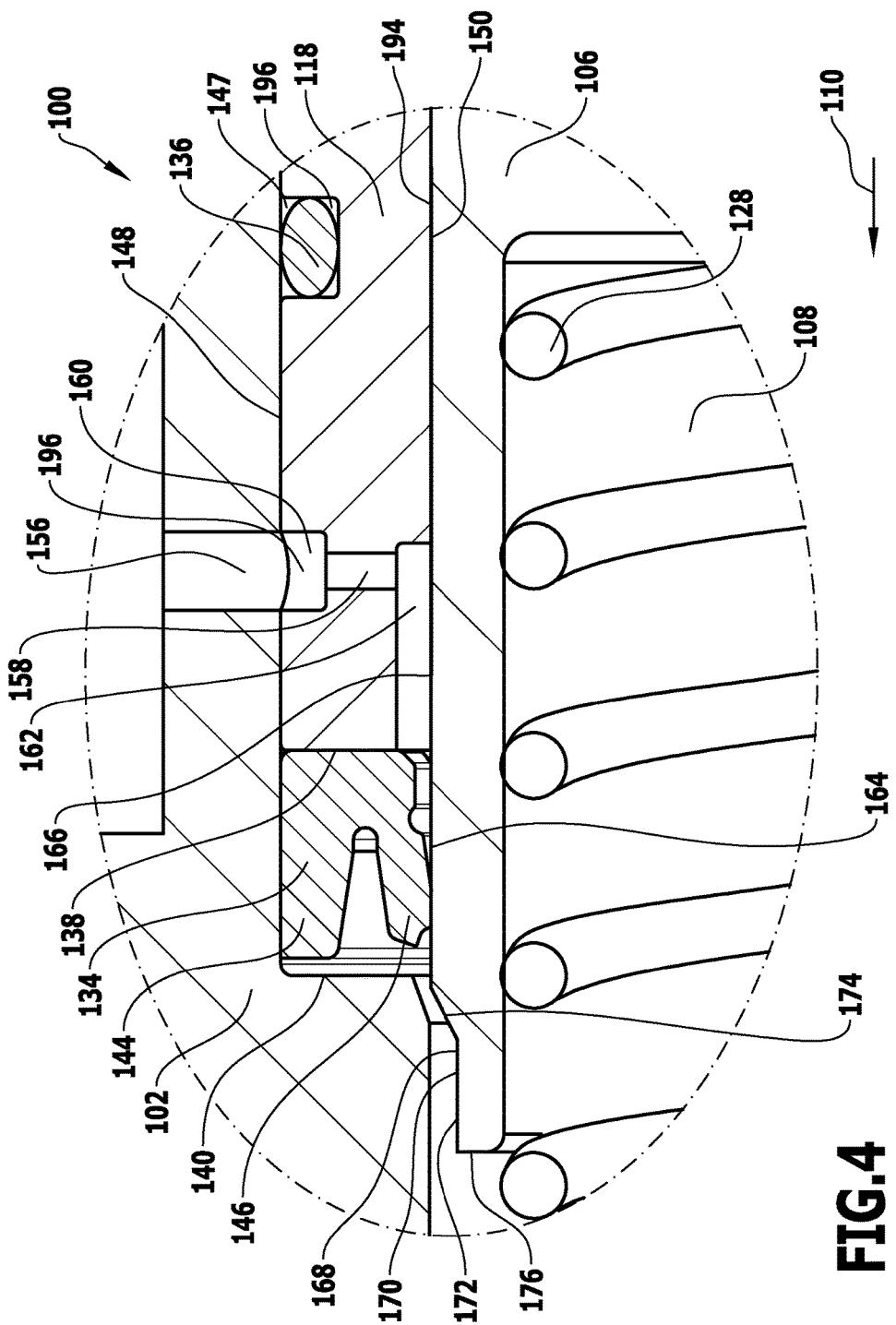
FIG. 4 shows a schematic representation of the master cylinder corresponding to FIG. 3, wherein the piston is arranged in an actuating position.

As shown in particular in FIG. 3, in this position, hydraulic medium can be fed from the supply chamber 154 through the supply opening 156 in the base member 116 of the cylinder housing 102 to the annular channel 160 in the cylinder sleeve 118.

By means of the annular channel 160, the hydraulic medium is then evenly distributed in the peripheral direction of the cylinder sleeve 118 and is fed via the supply opening 158 in the cylinder sleeve 118 to the medium channels 162.

The medium channels 162 adjoin the main sealing element 134 which, in the pressure equalisation position, is spaced apart from the piston 106, so that the gap 178 is formed.

By means of the gap 178, the hydraulic medium can therefore be fed past the main sealing element 134 and to the cylinder chamber 108.

If the piston 106 is now moved in the actuating direction 110, the volume of the cylinder chamber 108 is reduced and therefore a pressure is built up in the cylinder chamber 108.

Due to the movement of the piston 106 in the actuating direction 110, the piston 106 reaches an actuating position (see FIG. 4) in which the main sealing element 134 abuts in sealing manner against the cylindrical lateral surface 166 of the first section 164 of the piston 106.

Due to the configuration of the main sealing element 134 as a lip seal, the pressure generated in the cylinder chamber 108 causes the sealing lip 146 of the main sealing element 134 to be pressed against the first section 164 of the piston 106 and by this means, a sealing effect is enhanced.

Escape of the hydraulic medium from the cylinder chamber 108 is possible in the actuating position of the piston 106 only through a hydraulic line (not shown) which can be connected to the hydraulic connector 114 of the master cylinder 100 and by means of which the hydraulic medium under pressure can be fed, for example, to a clutch system or a braking system in order to actuate a clutch or a brake.

If no force acts on the piston 106 in order to move said piston in the actuating direction 110, the piston 106 is moved, by the effect of the compression spring 128, against the actuating direction 110 until the piston 106 is arranged in the pressure equalisation position shown in FIG. 1.

In this position, hydraulic fluid can again be fed to the cylinder chamber 108 in order to ensure a constant quantity of hydraulic medium in the cylinder chamber 108 and therefore a reliable actuation of the clutch or the braking system.

A second embodiment of the master cylinder 100 shown in FIG. 7 differs from the first embodiment shown in FIGS. 1 to 6 essentially in that the piston 106 has a second section 168 which is not provided with a cylindrical lateral surface, but with a plurality of, for example six, recesses 182, by means of which a plurality of, for example six, gaps 178 are formed in order to be able to feed hydraulic medium past the main sealing element 134 to the cylinder chamber 108.

The recesses 182 form radially set-back regions 170 of the second section 168.

Otherwise, the second embodiment of the master cylinder 100 shown in FIG. 7 corresponds with the embodiment shown in FIGS. 1 to 6 with regard to structure and function, so that reference is therefore made to the above description in relation thereto.

Figure 8:
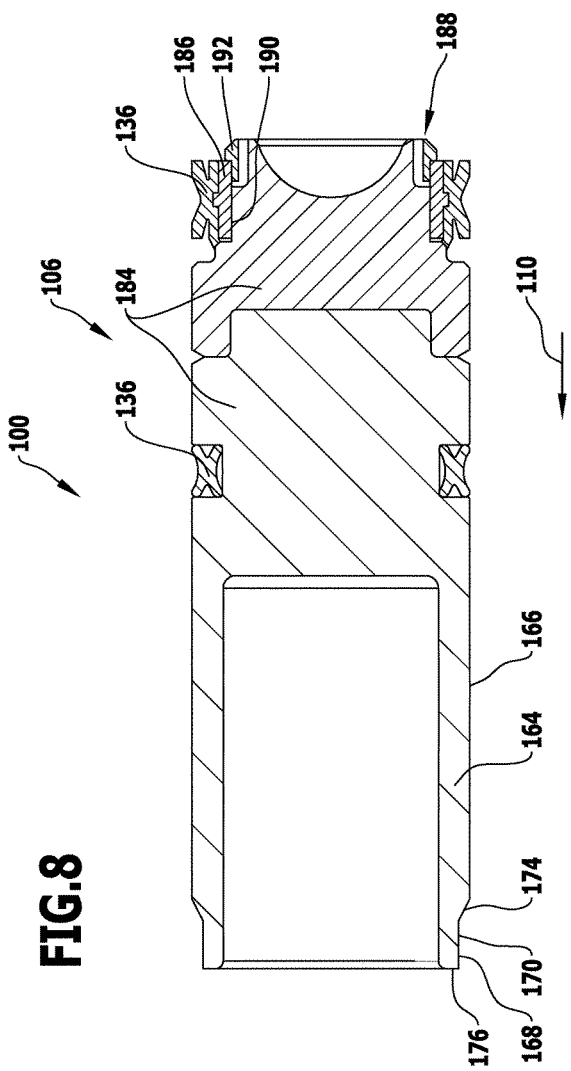
FIG. 8 shows a schematic longitudinal section through a piston of a third embodiment of the master cylinder, wherein the piston is formed in two parts and is provided with a clipped-on sealing element.

A third embodiment of a master cylinder 100 shown in FIG. 8 differs from the first embodiment shown in FIGS. 1 to 6 essentially in that the piston 106 is not formed in one part, but in two parts, wherein there are provided two components 184 of the piston 106 arranged behind one another in relation to the actuating direction 110 which are, for example, latched to one another or are connected to one another with a substance-to-substance bond.

Furthermore, in the third embodiment of the master cylinder 100 shown in FIG. 8, a back up sealing element 136 for sealing the piston 106 in relation to the cylinder sleeve 118 is also formed in two parts.

The back up sealing element 136 comprises the actual sealing element made of elastic, particularly elastomer, material and a carrier element 186 which is formed, for example, annular in shape and is fixable by means of a latching device 188 to the piston 106.

The piston 106 comprises a seating 190 onto which the carrier element 186 can be pushed. Furthermore, the piston 106 comprises at least one latching nose 192 by means of which the carrier element 186 can be secured against unwanted displacement along the actuating direction 110 of the piston 106.

The elastic material of which the actual seal consists is preferably vulcanised onto the carrier element 186. In this way, a combination of a carrier element 186 and a sealing element can be particularly easily manufactured.

Otherwise, the third embodiment of a master cylinder 100 shown in FIG. 8 corresponds with the embodiment shown in FIGS. 1 to 6 with regard to structure and function, and reference is therefore made to the above description thereof.

Figure 9:
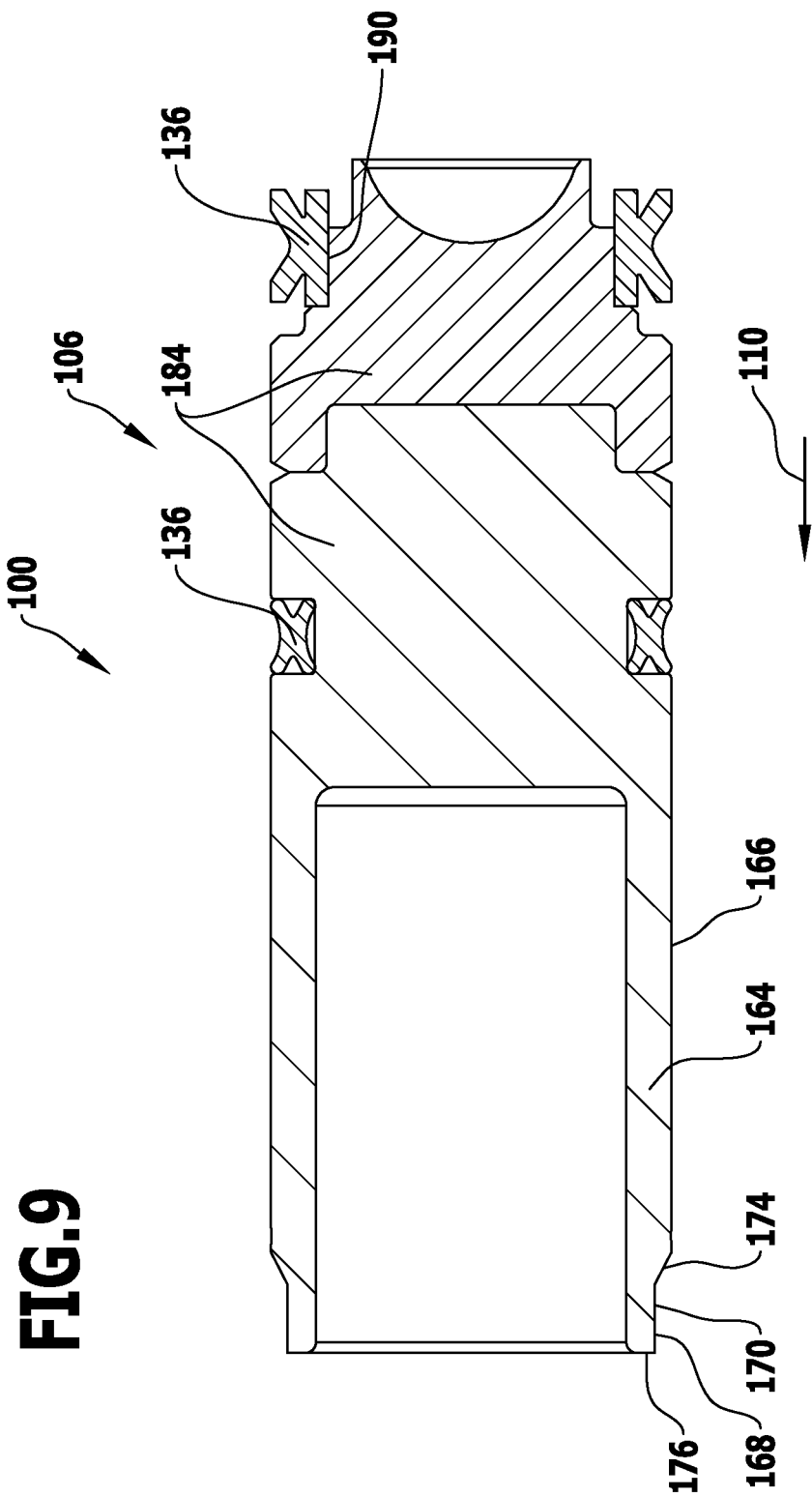
FIG. 9 shows a representation of a piston according to FIG. 8 of a fourth embodiment of a master cylinder, wherein the sealing element is vulcanised onto the piston.

A fourth embodiment of a master cylinder 100 shown in FIG. 9 differs from the third embodiment shown in FIG. 8 essentially in that no separate carrier element 186 is provided for receiving a sealing elastic material.

Furthermore, in the embodiment of the master cylinder 100 shown in FIG. 9, no latching device 188 is provided on the piston 106.

Rather, the sealing element, in particular the back up sealing element 136, in the fourth embodiment of the master cylinder 100 shown in FIG. 9 is vulcanised directly onto the piston 106 so that the piston 106 constitutes the carrier element 186.

Otherwise, the fourth embodiment of the master cylinder 100 shown in FIG. 9 corresponds with the embodiment shown in FIG. 8 with regard to structure and function, and reference is therefore made to the above description thereof.

Figure 10:
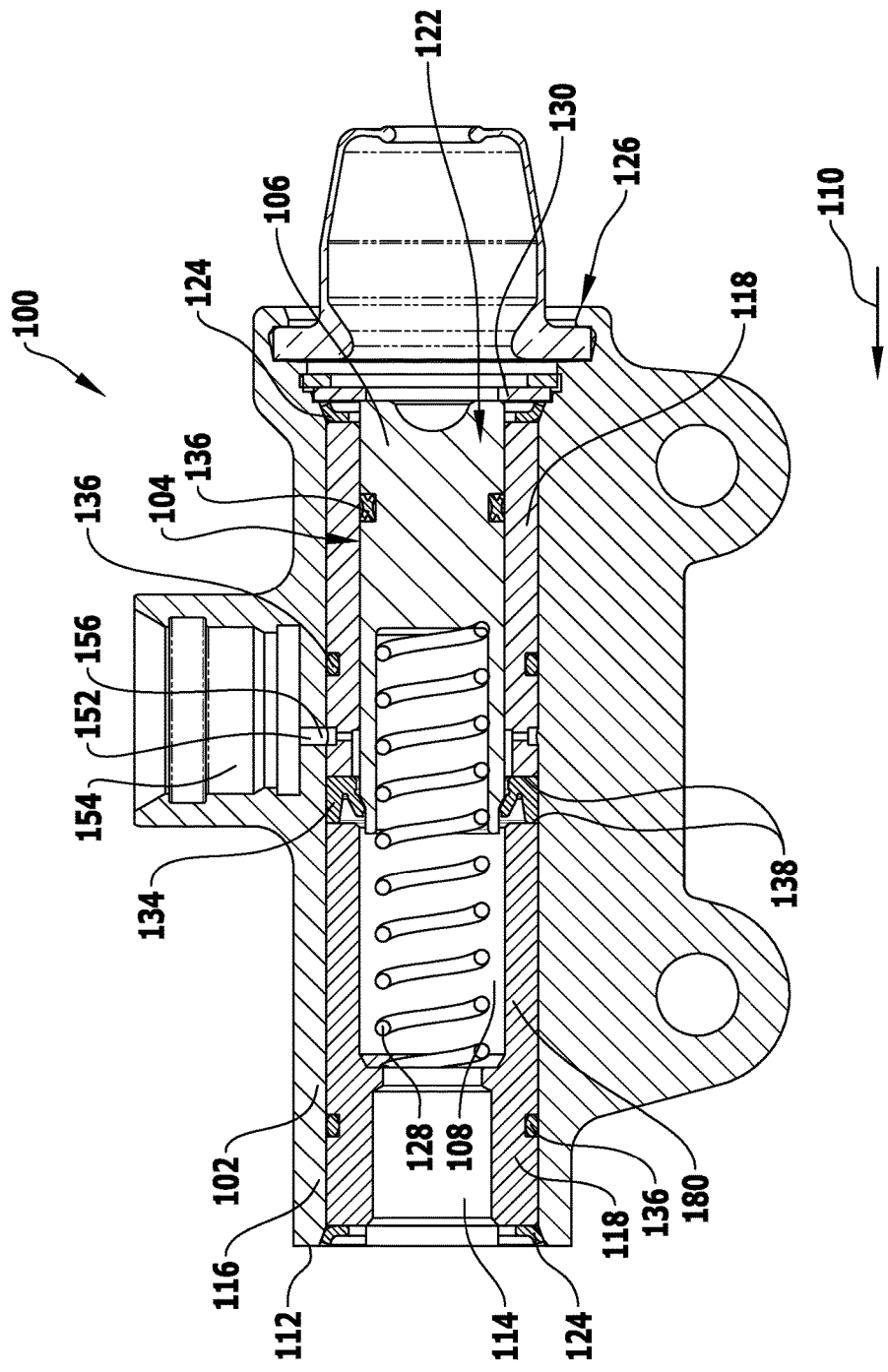
FIG. 10 shows a representation according to FIG. 1 of a fifth embodiment of a master cylinder, wherein a cylinder sleeve for the piston and a cylinder sleeve for the cylinder chamber are provided.

A fifth embodiment of a master cylinder 100 shown in FIG. 10 differs from the first embodiment shown in FIGS. 1 to 6 essentially in that the cylinder housing 102 is formed in three parts and comprises a base member 116 and two cylinder sleeves 118.

Corresponding to the first embodiment as shown in FIGS. 1 to 6, one of the cylinder sleeves 118 serves to accommodate and guide the piston 106.

The further cylinder sleeve 118 is arranged in the region of the cylinder chamber 108 and forms the wall 180 of the cylinder chamber 108 and preferably also the hydraulic connector 114 of the cylinder housing 102.

The sleeve bore 120 is preferably a continuous bore with a uniform internal diameter extending from the hydraulic side 112 of the cylinder housing 102 to the insertion side 126 of the cylinder housing 102.

In that, in the fifth embodiment of the master cylinder 100 shown in FIG. 10, the wall 180 of the cylinder chamber 108 is also formed by a cylinder sleeve 118, the base member 116 of the cylinder housing 102 in particular can be manufactured particularly easily.

In the fifth embodiment of the master cylinder 100 shown in FIG. 10, the main sealing element 134 is arranged between the ends 138 of the cylinder sleeves 118 facing toward one another. For this purpose, the two cylinder sleeves 118 are arranged spaced apart from one another so that the seating 142 is formed.

Otherwise, the fifth embodiment of the master cylinder 100 shown in FIG. 10 corresponds with the embodiment shown in FIGS. 1 to 6 with regard to structure and function, and reference is therefore made to the above description thereof.

Figure 11:
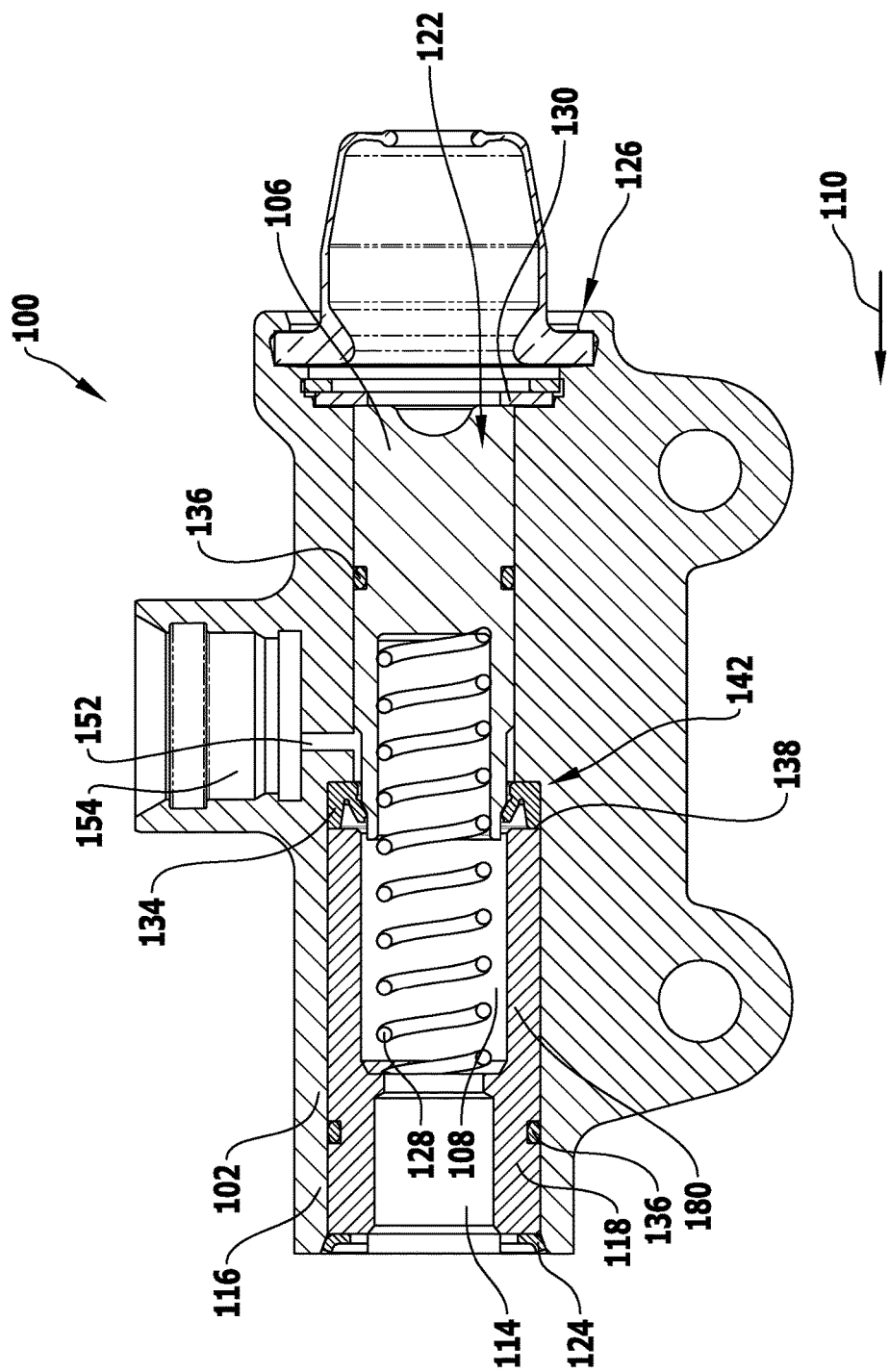
FIG. 11 shows a representation according to FIG. 1 of a sixth embodiment of a master cylinder, wherein in place of a cylinder sleeve for the piston, a cylinder sleeve is provided for the cylinder chamber.

A sixth embodiment of a master cylinder 100 shown in FIG. 11 differs from the fifth embodiment shown in FIG. 10 essentially in that only one cylinder sleeve 118 is provided which forms the wall 180 of the cylinder chamber 108. In the sixth embodiment of the master cylinder 100 shown in FIG. 11, the piston 106 is accommodated without a cylinder sleeve 118 in the base member 116 of the cylinder housing 102.

The medium channels 162 are formed, in particular, in the piston 106 in order to enable a reliable flow of hydraulic medium into the cylinder chamber 108.

Otherwise, the sixth embodiment of the master cylinder 100 shown in FIG. 11 corresponds, with regard to the structure and function thereof, with the fifth embodiment shown in FIG. 10, and reference is therefore made to the above description thereof.

The use of different sections 164, 168 of the piston 106 in order to be able to feed hydraulic medium past the main sealing element 134 to the cylinder chamber 108, enables the formation of a piston 106 without continuous supply bores. By this means, the piston 106 can be easily manufactured without the risk of any disadvantages in the feeding of hydraulic medium into the cylinder chamber 108.

The invention claimed is:

1. A Master cylinder, in particular for a clutch system, an actuating system or a braking system of a vehicle, comprising a cylinder housing with a piston bore and a cylinder chamber, a piston arranged displaceably in the piston bore between an actuating position and a pressure equalisation position, and a main sealing element arranged between the cylinder housing and the piston and delimiting the cylinder chamber, wherein at least one supply opening is provided in the cylinder housing, which supply opening opens on a side of the main sealing element facing away from the cylinder chamber into an intermediate space between the piston and the cylinder housing on one side and into a supply chamber on the other side;

the piston comprising a first section which has a cylindrical lateral surface and the piston comprising a second section which has at least one region which is set back radially inwardly with respect to the cylindrical lateral surface of the first section, the at least one set-back region extending to an end of the piston facing toward the cylinder chamber, the first and second sections are arranged on the piston in such a way that in an actuating position of the piston, the main sealing element in the first section of the piston abuts in sealing manner thereagainst and in the pressure equalisation position of the piston, in the second section of the piston between the piston and the main sealing element, at least one gap is formed, through which hydraulic medium can flow along the piston from the supply chamber into the cylinder chamber in order to equalise the pressure, a base member of the cylinder housing has at least one sleeve bore in order to receive at least one cylinder sleeve of the cylinder housing, one cylinder sleeve serves to accommodate and guide the piston, said cylinder sleeve is guiding the piston in the pressure equalizing position and in the course of movement from the pressure equalization position to the actuating position; and wherein a back up sealing element is provided in an annular recess in the piston and providing a back up seal between the piston and the cylinder sleeve surrounding the piston.

2. The master cylinder according to claim 1, wherein the at least one region of the second section which is set back radially inwardly relative to the cylindrical lateral surface of the first section has a cylindrical lateral surface, wherein an external diameter of the second section of the piston is smaller than an external diameter of the first section of the piston.

3. The master cylinder according to claim 2, wherein a transition section of the piston, which is arranged between the first section and the second section of the piston, has an external diameter which increases along the piston from the external diameter of the second section to the external diameter of the first section.

4. The master cylinder according to claim 1, wherein the master cylinder comprises at least one main sealing element and/or at least one back up sealing element which is configured as an O-ring seal, an X-ring seal, a lip seal or a plunger seal.

5. The master cylinder according to claim 1, wherein in the assembled state of the master cylinder, a seating for the main sealing element is provided between an end of the at least one cylinder sleeve which faces toward the cylinder chamber and serves to accommodate and guide the piston and an end of the sleeve bore facing toward the cylinder chamber.

6. The master cylinder according to claim 1, wherein in the assembled state of the master cylinder, a seating for the main sealing element is provided between an end of the at least one cylinder sleeve which faces toward the piston and forms at least one section of a wall of the cylinder chamber and an end of the sleeve bore facing toward the piston.

7. The master cylinder according to claim 1, wherein the piston is formed at least partially or at least in sections of a plastics material.

8. The master cylinder according to claim 1, wherein at least a part of the cylinder housing is made of a thermoplastic material.

9. The master cylinder according to claim 1, wherein the piston is made in at least two parts.

10. A master cylinder, in particular for a clutch system, an actuating system or a braking system of a vehicle, comprising a cylinder housing with a piston bore and a cylinder chamber, a piston arranged displaceably in the piston bore between an actuating position and a pressure equalisation position, and a main sealing element arranged between the cylinder housing and the piston and delimiting the cylinder chamber, wherein at least one supply opening is provided in the cylinder housing, which supply opening opens on a side of the main sealing element facing away from the cylinder chamber into an intermediate space between the piston and the cylinder housing on one side and into a supply chamber on the other side;

the piston comprising a first section which has a cylindrical lateral surface and the piston comprising a second section which has at least one region which is set back radially inwardly with respect to the cylindrical lateral surface of the first section, the at least one set-back region extending to an end of the piston facing toward the cylinder chamber, the first and second sections are arranged on the piston in such a way that in an actuating position of the piston, the main sealing element in the first section of the piston abuts in sealing manner thereagainst and in the pressure equalisation position of the piston, in the second section of the piston between the piston and the main sealing element, at least one gap is formed, through which hydraulic medium can flow along the piston from the supply chamber into the cylinder chamber in order to equalise the pressure, a base member of the cylinder housing has at least one sleeve bore in order to receive at least one cylinder sleeve of the cylinder housing, one cylinder sleeve serves to accommodate and guide the piston, at least one annular channel is formed on an external side of the one cylinder sleeve facing, in the assembled state of the master cylinder, toward the base member of the cylinder housing, several medium channels extending along an actuating direction of the piston are formed on an internal side of the one cylinder sleeve, several supply openings are provided in the one cylinder sleeve, each of said supply openings connecting said annular channel with one of the medium channels.

11. The master cylinder according to claim 10, wherein the at least one cylinder sleeve forms at least one section of a wall of the cylinder chamber.

12. The master cylinder according to claim 10, wherein the at least one annular channel is formed on at least one cylinder sleeve.

13. A master cylinder, in particular for a clutch system, an actuating system or a braking system of a vehicle, comprising a cylinder housing with a piston bore and a cylinder chamber, a piston arranged displaceably in the piston bore between an actuating position and a pressure equalisation position, and a main sealing element arranged between and contacting the cylinder housing and the piston and delimiting the cylinder chamber, wherein at least one supply opening is provided in the cylinder housing, which supply opening opens on a side of the main sealing element facing away from the cylinder chamber into an intermediate space between the piston and the cylinder housing on one side and into a supply chamber on the other side;

the piston comprising a first section which has a cylindrical lateral surface and the piston comprising a second section which has at least one region which is set back radially inwardly with respect to the cylindrical lateral surface of the first section, the at least one set-back region extending to an end of the piston facing toward the cylinder chamber, the first and second sections are arranged on the piston in such a way that in an actuating position of the piston, the main sealing element in the first section of the piston abuts in sealing manner thereagainst and in the pressure equalisation position of the piston, in the second section of the piston between the piston and the main sealing element, at least one gap is formed, through which hydraulic medium can flow along the piston from the supply chamber into the cylinder chamber in order to equalise the pressure, a base member of the cylinder housing receives a first cylinder sleeve in a first cylinder bore and a second cylinder sleeve in a second cylinder bore said first cylinder sleeve forms at least one section of a wall of the cylinder chamber and said second cylinder sleeve serves to accommodate and guide the piston, and in the assembled state of the master cylinder, a seating for the main sealing element is provided between an end of the first cylinder sleeve which faces toward the piston and an end of a second cylinder sleeve which faces toward the cylinder chamber.

14. The master cylinder according to claim 13, wherein a medium channel is formed in the cylinder housing and/or in the piston, through which at least in the pressure equalisation position of the piston, hydraulic medium can flow from the end of at least one supply opening facing toward the piston to the main sealing element.

* * * * *